United States Patent
Dec et al.

(10) Patent No.: US 9,559,855 B2
(45) Date of Patent: Jan. 31, 2017

(54) SYSTEM AND METHOD FOR PROVIDING MULTICAST DELIVERY IN A NETWORK ENVIRONMENT

(75) Inventors: Wojciech Dec, Amsterdam (NL); William M. Townsley, Paris (FR); Ole Troan, Bergen (NO); Stig I. Venaas, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 845 days.

(21) Appl. No.: 12/784,278

(22) Filed: May 20, 2010

(65) Prior Publication Data

US 2011/0286470 A1    Nov. 24, 2011

(51) Int. Cl.
*H04L 29/02* (2006.01)
*H04L 12/18* (2006.01)
*H04L 12/28* (2006.01)
*H04L 29/12* (2006.01)
*H04L 29/06* (2006.01)

(52) U.S. Cl.
CPC ....... *H04L 12/1836* (2013.01); *H04L 12/2874* (2013.01); *H04L 12/2876* (2013.01); *H04L 12/2898* (2013.01); *H04L 29/12358* (2013.01); *H04L 61/251* (2013.01); *H04L 69/08* (2013.01); *H04L 69/167* (2013.01)

(58) Field of Classification Search
USPC .......... 370/466, 312, 467, 389, 390, 395.52; 709/230
See application file for complete search history.

(56) References Cited

U.S. PATENT DOCUMENTS

| | | |
|---|---|---|
| 5,959,989 A | 9/1999 | Gleeson et al. |
| 6,182,147 B1 | 1/2001 | Farinacci |
| 6,317,434 B1 | 11/2001 | Deng |
| (Continued) | | |

FOREIGN PATENT DOCUMENTS

| | | |
|---|---|---|
| WO | WO 00/51370 | 8/2000 |
| WO | WO 02/45334 | 6/2002 |
| WO | WO2004/012390 | 2/2004 |

OTHER PUBLICATIONS

S. Deering, "Host Extensions for IP Multicasting," Network Working Group, RFC 1112, 18 pages; http://tools.ietf.org/pdf/rfc1112.pdf.

(Continued)

*Primary Examiner* — Kevin C Harper
*Assistant Examiner* — Derrick V Rose
(74) *Attorney, Agent, or Firm* — Patent Capital Group

(57) ABSTRACT

A method is provided in one example and includes receiving signaling data associated with a request for a multicast channel, the request includes an Internet protocol version 6 (IPv6) source and an IPv6 group address. The method may also include identifying an Internet protocol version 4 (IPv4) source and an IPv4 group address to be mapped to the IPv6 source and the IPv6 group address. The signaling data can be converted from a first protocol to a second protocol. The converted signaling data can be communicated to a network element. In more particular embodiments, the network element is an IP edge router configured to join the multicast channel and stream data in response to receiving the converted signaling data. The IP edge router can be configured to perform an encapsulation operation to transport IPv6 multicast packets within an IPv4 multicast channel.

24 Claims, 5 Drawing Sheets

(56) References Cited

U.S. PATENT DOCUMENTS

| | | | |
|---|---|---|---|
| 6,331,983 | B1 | 12/2001 | Haggerty et al. |
| 6,457,059 | B1 | 9/2002 | Kobayashi |
| 6,597,703 | B1 | 7/2003 | Li et al. |
| 6,631,420 | B1 | 10/2003 | Li et al. |
| 6,633,765 | B1 | 10/2003 | Maggenti et al. |
| 6,654,371 | B1 | 11/2003 | Dunstan et al. |
| 6,711,172 | B1 | 3/2004 | Li |
| 6,853,639 | B1 | 2/2005 | Watanuki et al. |
| 6,947,440 | B2 | 9/2005 | Chatterjee et al. |
| 6,963,573 | B1 | 11/2005 | Cain et al. |
| 6,970,461 | B2 | 11/2005 | Unitt et al. |
| 6,988,146 | B1 | 1/2006 | Magret et al. |
| 7,012,891 | B1 | 3/2006 | Chandran et al. |
| 7,061,880 | B2 * | 6/2006 | Basilier ............................ 370/312 |
| 7,233,987 | B2 | 6/2007 | Watkinson |
| 7,310,335 | B1 | 12/2007 | Garcia-Luna-Aceves et al. |
| 7,418,003 | B1 | 8/2008 | Alvarez et al. |
| 7,483,439 | B2 | 1/2009 | Shepherd et al. |
| 7,502,372 | B2 | 3/2009 | Tsuchiya et al. |
| 7,583,698 | B2 * | 9/2009 | Higuchi et al. ................. 370/467 |
| 8,059,641 | B1 * | 11/2011 | Rai ................................ 370/389 |
| 8,228,942 | B2 * | 7/2012 | Mo ................................ 370/466 |
| 2001/0053156 | A1 * | 12/2001 | Higuchi ................... H04L 12/18 370/466 |
| 2002/0091926 | A1 | 7/2002 | Fukutomi |
| 2002/0097728 | A1 * | 7/2002 | Hinderks et al. ......... 370/395.52 |
| 2002/0191584 | A1 | 12/2002 | Korus et al. |
| 2003/0035398 | A1 | 2/2003 | Sato |
| 2003/0076854 | A1 | 4/2003 | Mudhar et al. |
| 2003/0108041 | A1 | 6/2003 | Aysan et al. |
| 2004/0022244 | A1 | 2/2004 | Boers et al. |
| 2004/0100983 | A1 | 5/2004 | Suzuki |
| 2004/0122890 | A1 | 6/2004 | Watkinson |
| 2004/0162909 | A1 * | 8/2004 | Choe et al. ..................... 709/230 |
| 2004/0264465 | A1 * | 12/2004 | Dunk ................... H04L 12/4633 370/392 |
| 2005/0076207 | A1 | 4/2005 | Park et al. |
| 2006/0045036 | A1 | 3/2006 | Isobe et al. |
| 2006/0062220 | A1 | 3/2006 | Suga |
| 2006/0088031 | A1 | 4/2006 | Nalawade |
| 2006/0133375 | A1 | 6/2006 | Napierala |
| 2006/0140213 | A1 * | 6/2006 | Hwang et al. ................. 370/466 |
| 2006/0159091 | A1 | 7/2006 | Boers et al. |
| 2006/0159092 | A1 | 7/2006 | Boers et al. |
| 2006/0168047 | A1 | 7/2006 | Li |
| 2009/0147718 | A1 * | 6/2009 | Liu et al. ....................... 370/312 |
| 2011/0075551 | A1 * | 3/2011 | Lee ................................ 370/217 |
| 2011/0176545 | A1 | 7/2011 | Boers et al. |

OTHER PUBLICATIONS

Estrin, et al., "Protocol Independent Multicast-Sparse Mode (PIM-SM): Protocol Specification," Sep. 9, 1997, 52 pages; http://www.cise.ufl.edu/~helmy/papers/PIM-SM-Spec-97protocol.pdf.
B. Carpenter, et al., "Transmission of IPv6 over IPv4 Domains Without Explicit Tunnels," Network Working Group, RFC 2529, Mar. 1999, 11 pages; http://tools.ietf.org/pdf/rfc2529.pdf.
E. Rosen et al., "BGP/MPLS VPNs," Network Working Group, RFC 2547, Mar. 1999, 26 pages; http://tools.ietf.org/html/rfc2547.
B. Carpenter, et al., "Connection of IPv6 Domains via IPv4 Clouds," Network Working Group, RFC 3056, 24 pages; http://tools.ietf.org/pdf/rfc3056.pdf.
Cisco Systems, Inc., "IP Multicast Technology Overview," Apr. 18, 2002, 24 pages; http://www.cisco.com/univercd/cc/td/doc/cisintwk/intsolns/mcst_sol/mcst_ovr.htm.
B. Cain, et al., "Internet Group Management Protocol, Version 3," Network Working Group, RFC 3376, Oct. 2002, 54 pages; http://www.rfc-editor.org/rfc/rfc3376.txt.
Dave Thaler, "Support for Multicast Over 6to4 Networks," NGTrans Working Group, Internet-Draft, Jun. 29, 2002, 9 pages; http://www3.tools.ietf.org/html/draft-ietf-ngtrans-6to4-multicast-01.
Supratik Bhattacharyya et al., "An Overview of Source-Specific Multicast (SSM)," Network Working Group, RFC 3569, Jul. 2003, 15 pages;http://tools.ietf.org/pdf/rfc3569.pdf.
B. Haberman, "IGMPv3/MLDv2 and Multicast Routing Protocol Interaction," MAGMA Working Group, Internet Draft, Apr. 2004, 7 pages; http://tools.ietf.org/pdf/draft-ietf-magma-igmpv3-and-routing-05.pdf.
H. Holbrook, et al., "Source-Specific Multicast for IP," Internet Draft, Apr. 4, 2006, 18 pages. http://tools.ietf.org/id/draft-ietf-ssm-arch-07.txt.
Juniper Networks, "Introduction to IGMP for IPTV Networks," White Paper © 2007, 12 pages; www.juniper.com.
E. Rosen et al., "Multicast in MPLS/BGP IP VPNs," Network Working Group, Internet Draft, Apr. 2007, 74 pages; http://tools.ietf.org/pdf/draft-ietf-l3vpn-2547bis-mcast-04.pdf.
C. Metz, et al., "Softwires Mesh Multicast Problem Statement," Softwires Working Group, Internet Draft, Feb. 15, 2008, 17 pages; http://tools.ietf.org/pdf/draft-metz-softwires-multicast-problem-statement-00.pdf.
S. Venaas, et al., "An IPv4—IPv6 Multicast Translator," Network Working Group, Internet Draft, Jul. 8, 2009, 12 pages; http://tools.ietf.org/pdf/draft-venaas-behave-mcast46-01.pdf.
W. Townsley, et al., "IPv6 via IPv4 Service Provider Networks," Internet Engineering Task Force, Internet Draft, Jul. 28, 2009, 15 pages; http://tools.ietf.org/pdf/draft-townsley-ipv6-6rd-01.pdf.
H. Holbrook, et al., "IP Multicast Channels: Express Support for Large-Scale Single-Source Applications," Computer Communications Review, Association for Computing Machinery, vol. 29, No. 4, Oct. 1999, XP000852190, 14 pages.
S. Venaas, et al., "Framework for IPv4/IPv6 Multicast Translation," Network Working Group, Internet Draft, Oct. 24, 2009, 23 pages; http://tools.ietf.org/pdf/draft-venaas-behave-v4v6mc-framework-01.pdf.
EPO, European Search Report dated Apr. 19, 2010 for EP Application No. 07122045, 5 pages.
"Source Specific Multicast (SSM) Homepage," Cisco IOS Software—IP Multicast Development & Dev/Test Groups, Nov. 29, 2000, pp. 1-6, http://ftpeng.cisco.com/ipmulticast/ssm/index.html.

* cited by examiner

SYSTEM AND METHOD FOR PROVIDING MULTICAST DELIVERY IN A NETWORK ENVIRONMENT

TECHNICAL FIELD

This disclosure relates in general to the field of communications and, more particularly, to providing multicast delivery in a network environment.

BACKGROUND

Networking architectures have grown increasingly complex in communication environments. As the subscriber base of end users increases, proper routing and efficient management of communication sessions and data flows becomes critical. Internet Protocol (IP) communications generally provide different types of communication methods across a network (e.g., unicast, broadcast, and multicast). Unicast is a method of point-to-point communication, and it is typically used when two nodes need to exchange data, where neither node is concerned with sharing the data with multiple hosts. Broadcast communications can reach hosts on a broadcast domain, and multicast communications can allow a group of hosts to receive messages without broadcasting those messages to all of the hosts in the broadcast domain. The ability to coordinate different protocols across networks presents a significant challenge for component manufacturers, network operators, and service providers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and includes receiving signaling data associated with a request for a multicast channel, the request includes an Internet protocol version 6 (IPv6) source and an IPv6 group address. The method may also include identifying an Internet protocol version 4 (IPv4) source and an IPv4 group address to be mapped to the IPv6 source and the IPv6 group address. The signaling data can be converted from a first protocol to a second protocol. The converted signaling data can be communicated to a network element. In more particular embodiments, the network element is an IP edge router configured to join the multicast channel and stream data in response to receiving the converted signaling data. The IP edge router can be configured to perform an encapsulation operation to transport IPv6 multicast packets within an IPv4 multicast channel.

In more particular embodiments, the first protocol is a multicast listener discovery (MLD) protocol and the second protocol is an Internet Management Group Protocol (IGMP). An addressing plan can be configured for a network in which the network element resides, the addressing plan including IPv4 and IPv6 object mappings. In more detailed embodiments, the method may include receiving IPv4 packets that include IPv4 headers that are part of encapsulated IPv6 packets; removing the IPv4 headers from the IPv4 packets; and communicating the IPv6 packets to a host associated with the request for the multicast channel. In particular embodiments, the method may include accessing a mapping table that includes mappings between the IPv6 source and the IPv6 group address, and the IPv4 source and the IPv6 group address.

Example Embodiments

Figure 1:
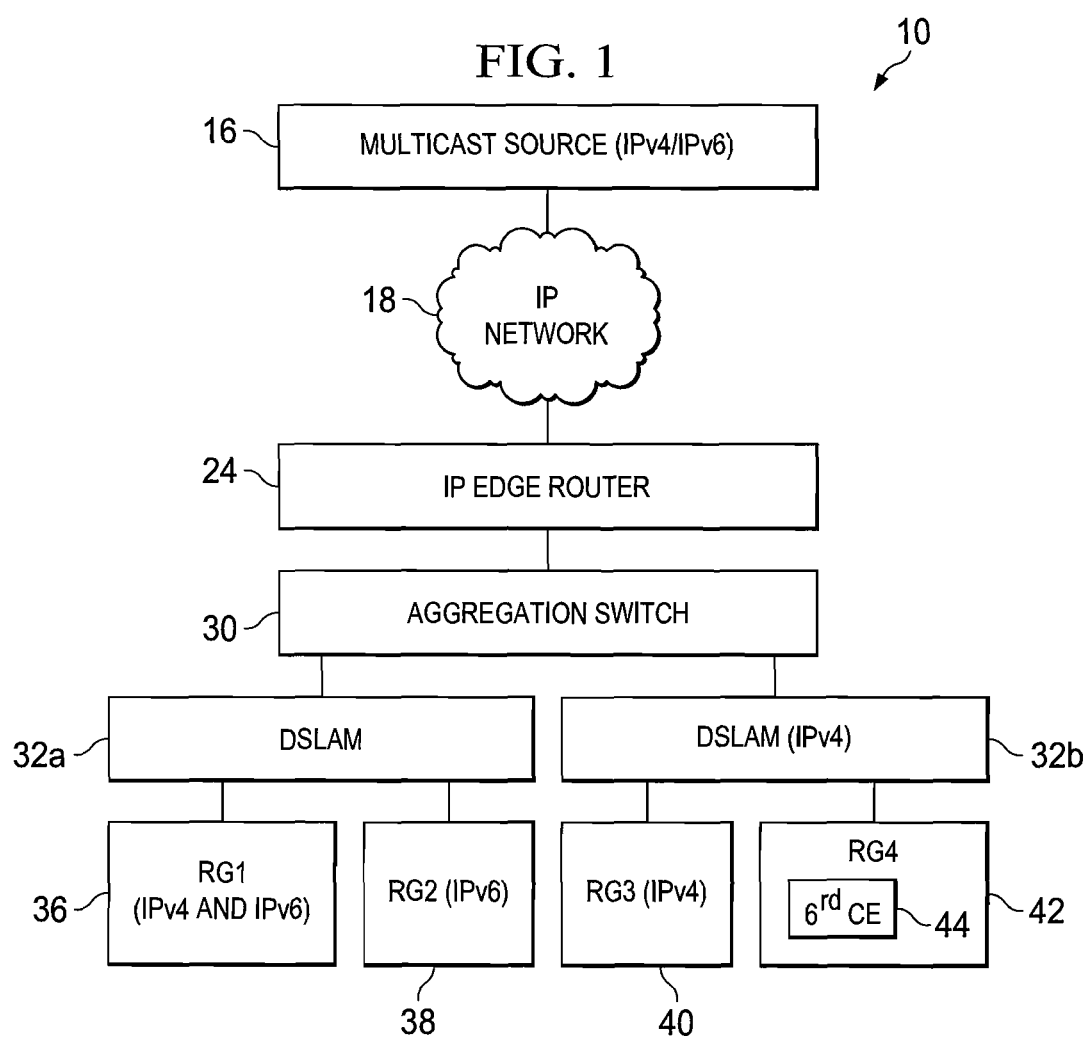
FIG. 1 is a simplified block diagram of a communication system for providing multicast delivery in a network environment in accordance with one embodiment of the present disclosure.

Turning to FIG. 1, FIG. 1 is a simplified block diagram of a communication system 10 for offering a multicast delivery that accommodates both Internet protocol (IP) version four (IPv4) and IP version six (IPv6) protocols. In one particular example, communication system 10 may include a multicast source 16, an IP network 18, an IP edge router 24, and an aggregation switch 30. Additionally, communication system 10 may include a digital subscriber line access multiplexer (DSLAM) 32a and a second DSLAM 32b, which is associated with IPv4. DSLAM 32a may be coupled to a residential gateway (RG1) 36 and a residential gateway (RG2) 38. DSLAM 32b may be coupled to a residential gateway (RG3) 40 and a residential gateway (RG4) 42, which may include a 6rd customer edge (CE) 44 element. The residential gateways may be provisioned to enable/support IPv4 and/or IPv6, as is illustrated in FIG. 1. For purposes of discussion and explanation, various permutations of the RGs have been illustrated, where (for purposes of explaining the present disclosure) the focus is on RG1 and RG2.

In one particular instance, communication system 10 can be associated with a service provider digital subscriber line (DSL) residential deployment. In other examples, communication system 10 could be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures. Communication system 10 may include a configuration capable of transmission control protocol/internet protocol (TCP/IP) communications for the transmission and/or reception of packets in a network. Communication system 10 may also operate in conjunction with a user datagram protocol/IP (UDP/IP) or any other suitable protocol, where appropriate and based on particular needs.

For purposes of illustrating certain example techniques of communication system 10, it is important to understand the communications that may be traversing the network. The following foundational information may be viewed as a basis from which the present disclosure may be properly explained. Typically, multicast is the preferred method of communication for network distribution applications. Multicast is a bandwidth-conserving technology that reduces traffic by simultaneously delivering data to multiple hosts. Multicast leverages the concept of a group. A multicast group is an arbitrary group of receivers that express an interest in receiving a particular data stream from a source. A host seeking to receive data sent to a multicast group can join the group using Internet Management Group Protocol (IGMP). Hosts that are members of a given multicast group can receive data sent to that multicast group.

IGMP is a protocol used by hosts and by multicast-enabled routers to form (and to manage) a multicast group. To join a group, a host typically sends an IGMP membership report to a local multicast router. The membership report can indicate (to the local multicast router) that the host is interested in joining a particular multicast group. The address of the multicast group is often included in the membership report. The router, recognizing that the host wishes to join the group, establishes a path form the source to the host, and then forwards data to the host accordingly. There are multiple versions of IGMP, and communication system 10 can readily accommodate any of these versions.

In operation, IGMP can provide several fundamental functions for IP multicasting networks, such as: 1) join (an IGMP host indicates that it wants to receive information from (i.e., become a member of) a multicast group; 2) leave (an IGMP host indicates that it no longer wishes to receive information from a multicast group); and 3) query (an IGMP router can ask the hosts if they are members of specific groups). Queries may be inclusive of a specific query, asking whether the host is a member of a specified multicast group. Queries may also be inclusive of a general query, asking the host to indicate all groups to which it belongs. In addition, a membership report can be generated, where an IGMP host can identify the groups to which it belongs.

It is possible for multiple sources to transmit data to a single multicast group. For example, one source may transmit video data to a multicast group. Source Specific Multicast (SSM) is a mechanism that can extend existing multicast protocols by providing source filtering within a multicast network. When a host joins a particular multicast group, the host can specify not only the multicast group the host wishes to join, but also the source from which data is sent to the multicast group. Source filtering allows a host to block out unwanted or even malicious data streams sent from unknown sources to the multicast group.

SSM can implement source filtering through channels, which can be thought of as an extension of groups. A channel is identified by an SSM group address (G) and a source address (S). A source transmits data to a SSM group address (G). A host can receive the data by subscribing to the channel (S,G). Thus, a host preferably should both the SSM group address (G) and the source address (S) before the host can subscribe to a channel.

6rd specifies a protocol mechanism to deploy IPv6 to sites via a service provider's IPv4 network. By using the service provider's IPv6 prefix, the operational domain of 6rd is limited to the service provider network. 6rd does not translate IPv4 into IPv6, rather, it encapsulates IPv6 in IPv4 with a destination IPv4 address that is either encoded within the IPv6 destination address itself, or is the destination address of a preconfigured 6rd border relay router. The border relay router can decapsulate the IPv4 header and, further, route the IPv6 packet outside the service provider's IPv4 network. In this manner, IPv6 packets follow the IPv4 routing topology within the service provider network, and border relays are traversed for IPv6 packets that are destined for (or that are arriving outside) the service provider's IPv4 network. 6rd decouples deployment of IPv6 on the local area network (LAN) side of the 6rd CE router from that on the WAN side: allowing IPv6 on either side to be deployed.

IP edge router 24 can be provisioned between an IPv6-enabled site and an IPv4-enable service provider network. In a residential broadband deployment, this is sometimes referred to as the residential gateway, customer premises equipment (CPE), or internet gateway device (IGD). This router commonly has at least one internal 6rd virtual interface (acting as an endpoint for the IPv6 in IPv4 encapsulation and forwarding), at least one 6rd CE LAN side interface, and at least one 6rd CE WAN side interface, respectively.

6rd is IPv4 tunneling over IPv6 (IPv4 packets are wrapped in IPv6 and subsequently transported). This allows IPv6 to be used in a system that was originally provisioned/configured for IPv4. 6rd can perform these activities for unicast traffic, but multicasting operations continue to be unresolved. 6rd, and the technology that it was based on (6 to 4), is defined for unicast packet delivery. For example, if a service provider wanted to deliver IPv6 multicast traffic over an IPv4 enabled network, there is no mechanism for accomplishing this objective.

In accordance with one example implementation, communication system 10 can offer a technique for transmitting IPv6 multicast traffic across network segments that support IPv4. The technique can leverage a multicast listener discovery (MLD)-to-IGMP translation, along with IPv4 in IPv6 multicast address embedding. This could further involve a translation of signaling and control plane traffic between IPv6 and IPv4, as further detailed below. In particular, communication system 10 can allow IPv6 multicast within the 6rd domain, utilizing IPv4 multicast infrastructure in the service provider network. In terms of advantages, such a technique can rely on a tunneling mechanism (i.e., IPv6 tunneling over IPv4), rather than cumbersome translations (in two directions). The approach of communication system 10 can also avoid use of application level gateways.

In operation, the control path signaling of communication system 10 achieves an effective translation between MLD and IGMP. Additionally, communication system 10 provides a 6rd-like optimization (e.g., an algorithm) for mapping the IPv6 multicast address space to IPv4. The mapping can occur between IPv6 and IPv4 address families, where this can involve a protocol translation and, potentially, the use of an algorithm in certain implementations.

A second mechanism of the present disclosure involves the operations of the RGs, which receive the encapsulated traffic. Typically, each RG is provisioned within (or is proximate to) an end user's home. In certain example implementations detailed herein, each RG may be configured to receive encapsulated traffic, strip out an outer IPv4 header, and pass IPv6 multicast packets. In addition, each RG can be configured to participate in multicast control signaling. For example, a number of IPv6 multicast receivers can be logically connected to each RG. The multicast receivers can include set-top boxes, personal computers, integrated receiver/decoders (IRDs), etc., or any other appropriate receiving element. Each multicast receiver can implement MLD for multicast control signaling. Hence, if a given multicast receiver is interested in receiving IPv6 communications, its respective RG can be tasked with receiving the tunneled traffic, and recognizing that (in the upstream direction) there is a connection to an IPv4 network. This recognition allows the RG to perform an appropriate translation from MLD signaling to IGMP control signaling. This MLD-to-IGMP conversion allows an IPv4 control message to be received at IP edge router 24. Note that MLD is simply a component of the IPv6 suite. MLD is used by IPv6 routers to discover multicast listeners on an attached link, much as IGMP is used in IPv4. The protocol is embedded in ICMPv6 instead of using a separate protocol.

Figure 2:
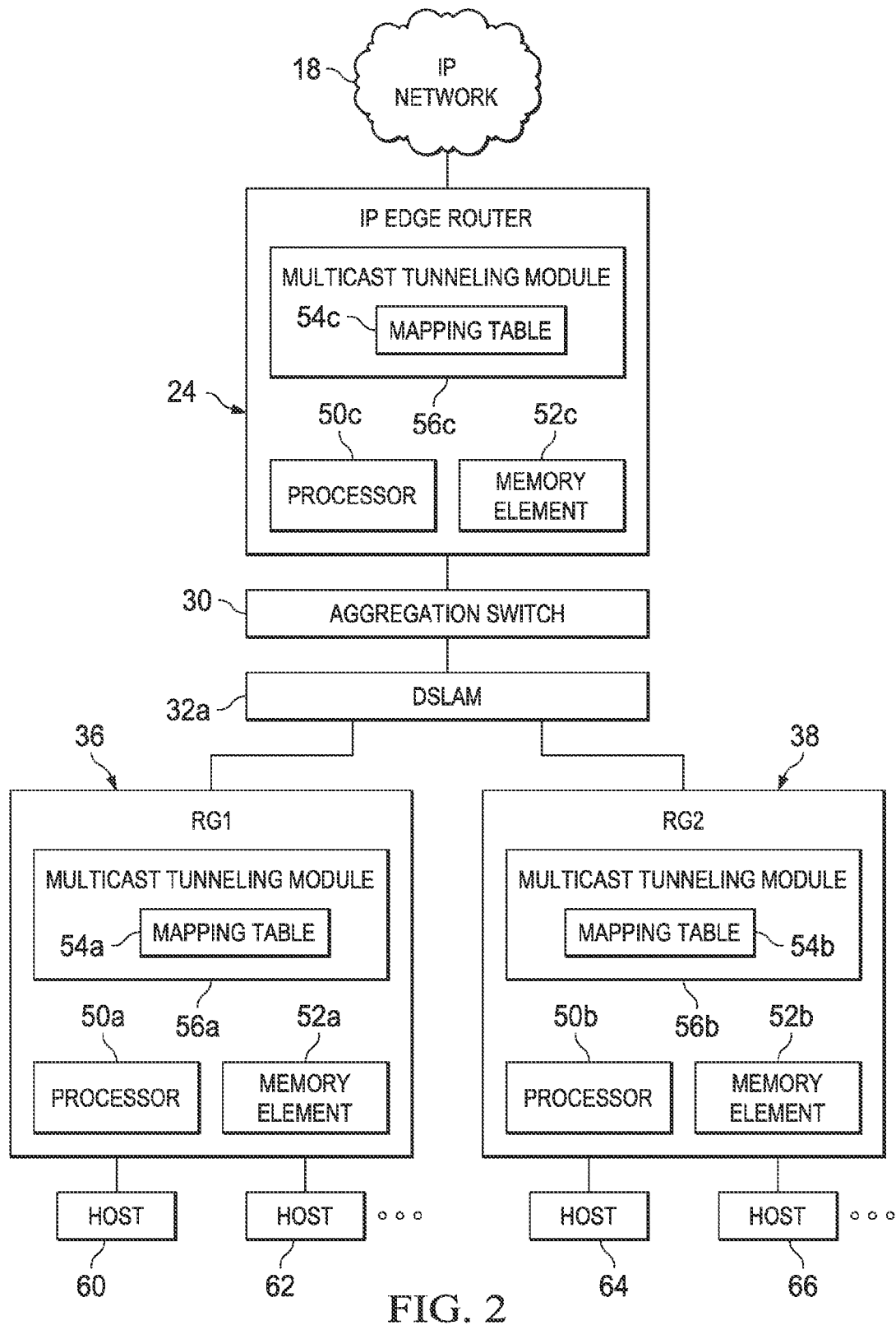
FIG. 2 is a simplified block diagram showing possible example details associated with the communication system.

Turning to FIG. 2, FIG. 2 is a simplified block diagram illustrating one possible set of details associated with communication system 10. In addition to the infrastructure of FIG. 1, FIG. 2 includes a set of multicast tunneling modules 56a-c being provisioned within IP edge router 24, RG 36, and RG 38 respectively. In addition, each of these elements can include a respective processor 50a-c, a respective memory element 52a-c, and a respective mapping table 54a-c. Mapping tables 54a-c can include any suitable IPv4 and IPv6 object mappings (e.g., source, group address, host information, channel identifiers, network characteristics, addressing plan, etc.). Also shown in FIG. 2 are a number of hosts 60, 62, 64, and 66. Before discussing potential flows associated with the architectures of FIG. 1-2, a brief discussion is provided about some of the possible infrastructure that may be included in communication system 10.

Hosts 60, 62, 64, and 66 can be associated with clients, customers, or end users wishing to initiate a communication in communication system 10 via some network. The term 'host' is inclusive of devices used to initiate a communication, such as a receiver, a computer, a set-top box, an IRD, or any other device, component, element, or object capable of initiating voice, audio, video, media, or data exchanges within communication system 10. Hosts 60, 62, 64, and 66 may also be inclusive of a suitable interface to the human user, such as a display, a keyboard, a touchpad, a remote control, or other terminal equipment. Hosts 60, 62, 64, and 66 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

IP network 18 represents a series of points or nodes of interconnected communication paths for receiving and transmitting packets of information that propagate through communication system 10. IP network 18 offers a communicative interface between sources and/or hosts, and may be any LAN, wireless local area network (WLAN), metropolitan area network (MAN), Intranet, Extranet, WAN, virtual private network (VPN), or any other appropriate architecture or system that facilitates communications in a network environment. IP network 18 may implement a UDP/IP connection and use a TCP/IP communication language protocol in particular embodiments of the present disclosure. However, IP network 18 may alternatively implement any other suitable communication protocol for transmitting and receiving data packets within communication system 10.

IP edge router 24 can be a 6rd border router, which represents the first hop IP router after IP network 18. In one particular example, this router enables the tunneling for the 6rd multicast mechanism discussed herein. Aggregation switch 30 may be any network element (e.g., a suitable layer-2 device) configured to receive and to send packets between IP edge router 24 and the elements downstream from aggregation switch 30 (e.g., DSLAMs, RGs, etc.).

IP edge router 24, RG 36, and/or RG 38 are network elements that facilitate multicast flows between hosts and/or sources in a given network (e.g., for networks such as those illustrated in FIGS. 1-2). As used herein in this Specification, the term 'network element' is meant to encompass routers, switches, gateways, bridges, loadbalancers, firewalls, inline service nodes, proxies, servers, processors, modules, or any other suitable device, component, element, or object operable to exchange information in a network environment. This network element may include any suitable hardware, software, components, modules, interfaces, or objects that facilitate the operations thereof. This may be inclusive of appropriate algorithms and communication protocols that allow for the effective exchange of data or information.

In one implementation, IP edge router 24, RG 36, and/or RG 38 include software to achieve (or to foster) the multicast delivery operations, as outlined herein in this Specification. Note that in one example, each of these elements can have an internal structure (e.g., a processor, a memory element, etc.) to facilitate some of the operations described herein. In other embodiments, these multicast delivery features may be provided externally to these elements or included in some other network element to achieve this intended functionality. Alternatively, IP edge router 24, RG 36, and/or RG 38 may include this software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

In operation, there is downstream multicasting (i.e., IPv6 in IPv4 tunneling between IP edge router 24 and a given RG) being achieved in communication system 10. In one particular example, an algorithm can be employed in order to determine IPv6-to-IPv4 S and G address mappings (e.g., using a 6rd technique) at IP edge router 24 and at the respective RG. This can be inclusive of any suitable IPv4 and IPv6 object mappings. Additionally, in an upstream direction, there can be a suitable translation/proxying by the RG for MLD-IGMP signaling.

Consider an example flow for purposes of discussion and explanation. The notation G',S' and G,S is used for IPv6 and IPv4 group and source addresses, respectively. A host attached to the RG can be made aware of the available IPv6 G' multicast-groups and any IPv6 S' multicast sources. The G' addresses may be from a reserved pool belonging to the service provider. The IPv6 host can send (toward the RG) an MLDv2 join request for multicasting a flow represented by (S',G'). The CPE can receive the MLDv2 request and, further, translate this into an IGMPv3 request: mapping the IPv6 (S',G') addresses to IPv4 (S,G) addresses using the mechanisms outlined herein.

More specifically, a unicast S' address can be parsed for the known IPv6 Internet service provider (ISP) prefix (i.e., 6rd prefix). Once identified, the S' address can be embedded in an IPv4 address, S, which is subsequently extracted. The multicast G' address can be mapped to a G address using a 6over4 protocol (i.e., mapping the lower two bytes of the G' address to the G pre-pended with a provider administered multicast group address scope (239.1.x.x, etc.) assigned for the tunneled multicast purpose).

In addition, the RG can send the resulting IGMPv3 message upstream to the DSLAM (as native IPv4). The RG can create an appropriate standard state within its MLD and IGMP processes on each side. The corresponding DSLAM and aggregation switch 30 can process the message as a regular IGMP (v3 or v2) message (e.g., IGMP snooping) and, further, install an appropriate layer-2 multicast filtering state.

IP edge router 24 can eventually receive the IGMP report. Based on the administratively assigned group address, IP edge router 24 can determine the IGMP report to relate to an IPv6 multicast flow. Using the inverse of the address mapping process used by the RG, IP edge router 24 determines the IPv6 (S',G') address from the IPv4 (S,G) addresses received in the IGMP report. From this point, regular IPv6 multicast routing processes can be executed, resulting (eventually) in the IPv6 multicast (S',G') data path on which packets are suitably delivered to IP edge router 24.

In this data forwarding path, IP edge router 24 can encapsulate IPv6 multicast (S',G') flow traffic (received from the source) into IPv4 multicast with (S,G). This can be performed in conjunction with using the IP-in-IP protocol type code-point (where the TTL field may also be copied). The resulting IPv4 multicast packets can be natively replicated by the IPv4 aggregation and access nodes (and ultimately arrive at the CPE). The CPE (e.g., provisioned within the RG) can recognize the IP-in-IP protocol code-point and, further, strip the IPv4 multicast header before forwarding the IPv6 multicast packet to the host. The host then receives native IPv6 multicast traffic.

Figure 3:
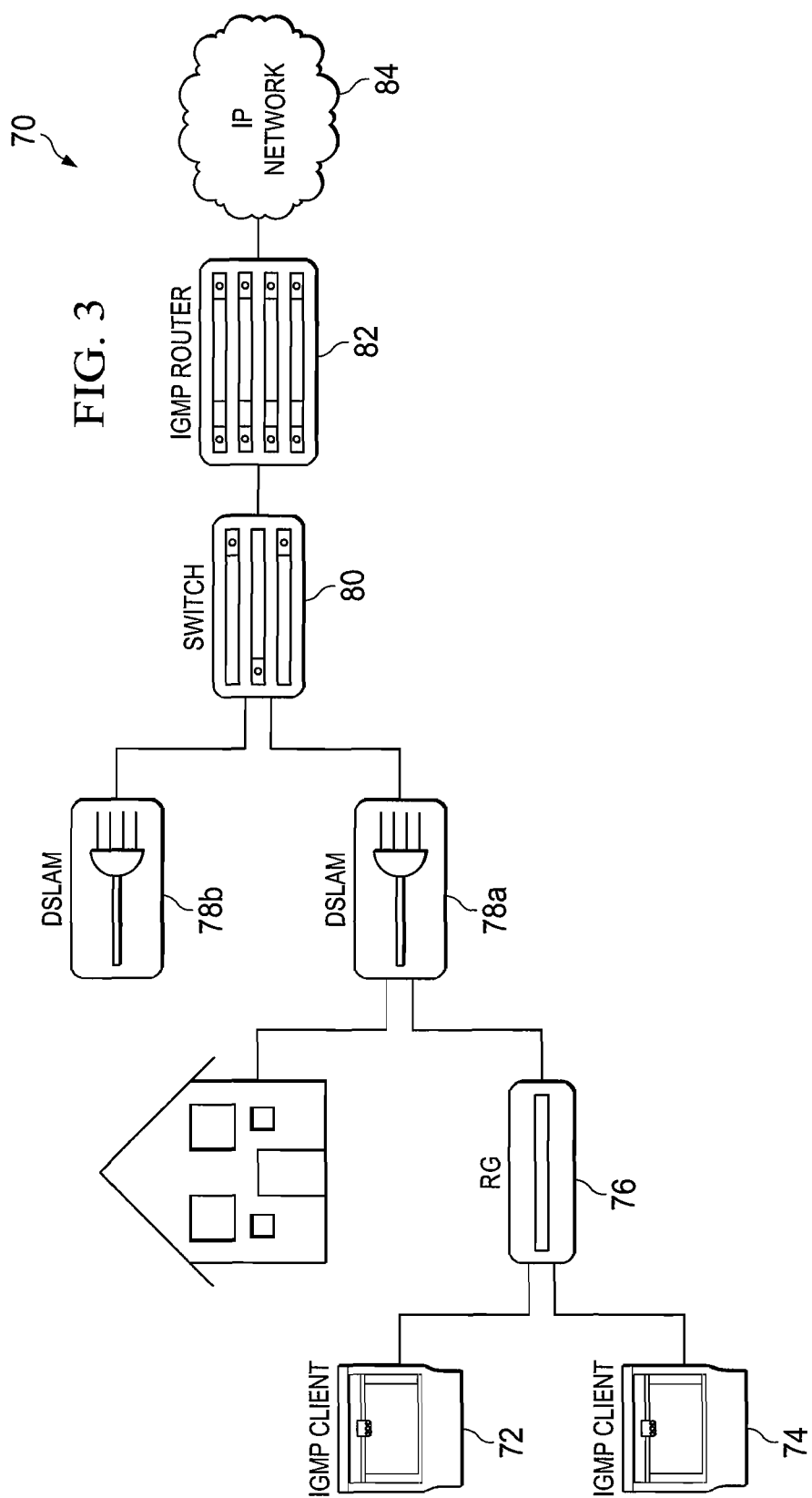
FIG. 3 is another simplified block diagram illustrating one potential application associated with the present disclosure.

FIG. 3 is a simplified block diagram illustrating one potential wireline broadband topology 70 that could implement the mechanisms of the present disclosure. This particular architecture of FIG. 3 is associated with a DSL access network that supports an IP television (IPTV) service. FIG. 3 illustrates two IGMP clients 72, 74, along with a residential gateway (RG) 76. Also illustrated in FIG. 3 is a set of DSLAMs 78a-b, a switch 80, and an IGMP router 82, which is coupled to an IP network 84. These elements can coordinate their activities in order to provide downstream multicast IPv6 in IPv4 tunneling between IGMP router 82 and RG 76. IPv6-to-IPv4 S and G address mappings can also be computed (e.g., using a 6rd technique) at IGMP router 82 and RG 76. In the upstream direction, RG 76 can perform MLD-IGMP translation/proxying. The optimizations that occur in the architecture of FIG. 3 are akin to the operations discussed above with reference to FIGS. 1-2.

In operation, at the subscriber site, a set-top box (within IGMP clients 72 or 74) can initiate channel change requests and, further, respond to status inquiries. RG 76 at the subscriber's site (and DSLAMs 78a-b) can aggregate traffic from multiple subscribers. IGMP router 82 can be a broadband services router (BSR), which can be the gateway into the backbone network. In IPTV networks, the set-top box is a small computer providing two-way communications on an IP network and which can decode the video streaming media. IP set-top boxes can have a built-in home network interface that can leverage Ethernet (or any existing home networking technology) that is implemented using existing home wiring (power lines, phone lines, coaxial cables, etc.). IGMP is the control mechanism used to manage the delivery of multicast traffic to interested and authorized users. IGMP commands can instruct the upstream equipment to stop sending (leave) one channel, or begin sending (join) another channel. Depending on the architectural choices, this process occurs in the DSLAM, an aggregation switch, or at an edge router (e.g., IGMP router 82).

When used in the IPTV architecture, IGMP operates in the following manner. The basic IGMP operation typically involves two devices, where the first device is the IGMP host (or client), which issues messages to join or to leave a multicast group (the client also responds to queries from the multicast router). A set-top box is an example of an IGMP host. The second device is the IGMP router (or multicast router), which responds to the join and leave messages to determine if multicast groups should be forwarded from an interface. Periodic queries can be used to recover from error conditions and to verify requests. The IGMP router receives multicast groups either using a multicast protocol such as Protocol-Independent Multicast (PIM), static flooding, etc.

In the architecture of FIG. 3, a suitable multicast tunneling module (inclusive of a mapping table) can be provisioned within IGMP router 82 and RG 76. Further, these elements can behave in the manner described above with reference to communication system 10, and the arrangements of FIGS. 1-2.

Figure 4:
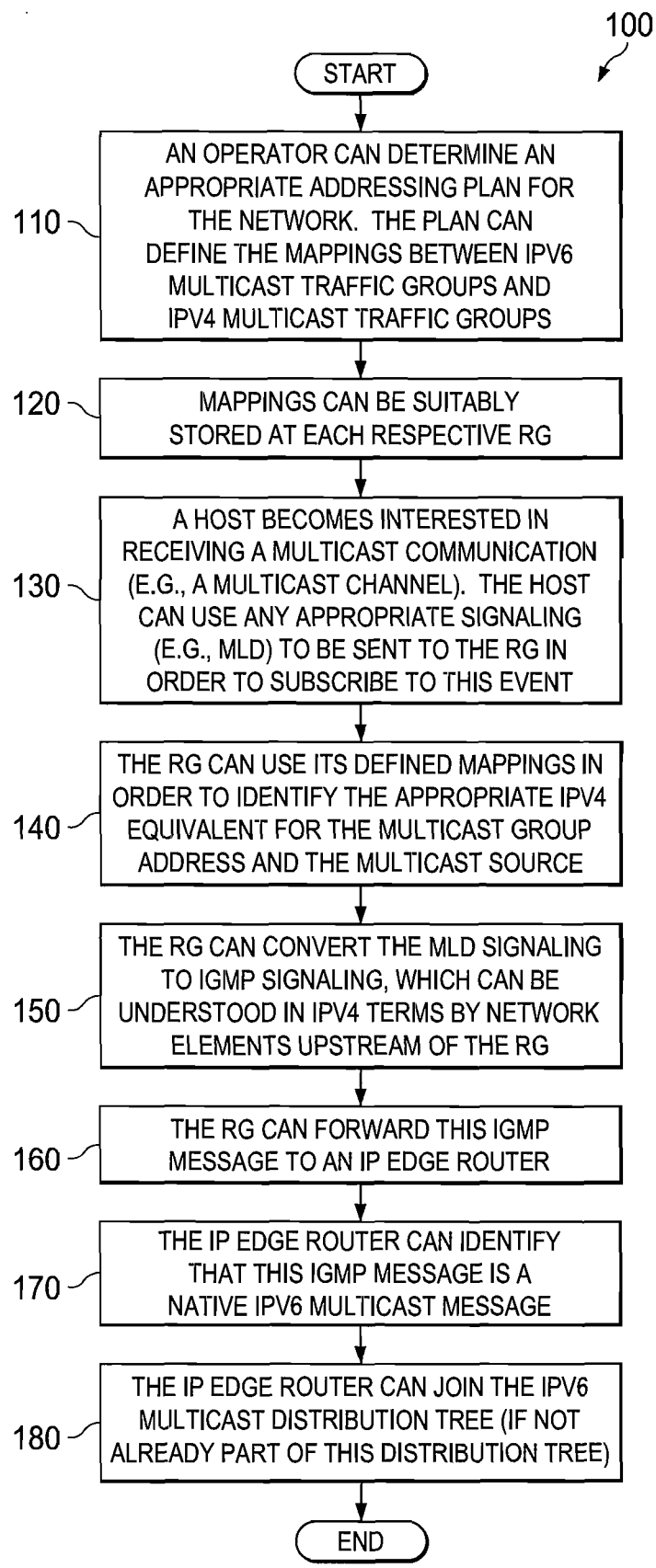
FIGS. 4-5 are simplified flowcharts illustrating potential operations associated with the communication system.

FIG. 4 is a simplified flowchart 100 illustrating one potential example operation associated with an upstream direction for communication system 10. The flow may begin at step 110, where an operator can determine an appropriate addressing plan for the network. More specifically, the plan can define the mappings between IPv6 multicast traffic groups and IPv4 multicast traffic groups. In one particular example, there is an appropriate mapping between IPv6 and IPv4 address families, which involves a protocol translation and, potentially, the use of an algorithm. Once the plan has been defined, those mappings can be suitably stored at each respective RG, as is illustrated at step 120. In other embodiments, those mappings can simply be stored at any appropriate network location (e.g., a database, a server, etc.) such that the mappings can be accessed.

At step 130, a host (coupled to a given RG) becomes interested in receiving a multicast communication (e.g., a multicast channel). The host can use any appropriate signaling (e.g., MLD) to be sent to the RG in order to subscribe to this event. This signaling can specify the IPv6 source and the IPv6 group address. At step 140, the RG can use its defined mappings in order to identify the appropriate IPv4 equivalent for the multicast group address and the multicast source. At step 150, the RG can convert the MLD signaling to IGMP signaling, which can be understood in IPv4 terms by network elements upstream of the RG. At step 160, the RG can forward this IGMP message to an IP edge router. At step 170, the IP edge router can identify that this IGMP message is a native IPv6 multicast message. At step 180, the IP edge router can join the IPv6 multicast distribution tree (if not already part of this distribution tree).

Figure 5:
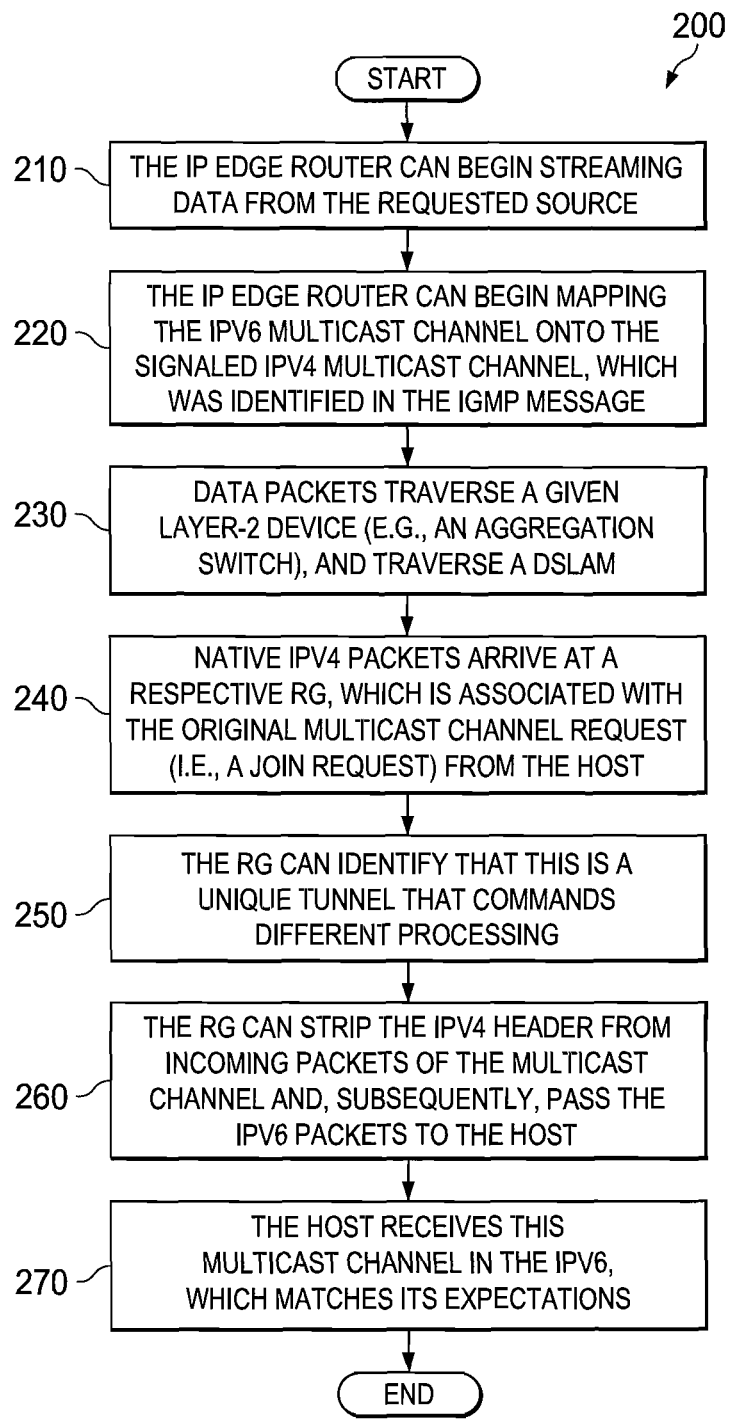

FIG. 5 is a simplified flowchart 200 illustrating one possible operation associated with downstream activities for communication system 10. FIG. 5 can be viewed as a logical continuation of the flow of FIG. 4, where streaming activities can be initiated by the IP edge router and, subsequently, flow downstream. The flow can begin at step 210, where the IP edge router can begin streaming data from the requested source. At step 220, the IP edge router can begin mapping the IPv6 multicast channel onto the signaled IPv4 multicast channel, which was identified in the IGMP message. Hence, for the data plane in the downstream direction, the IP edge router can perform encapsulation operations to transport IPv6 multicasting inside of the IPv4 multicast channel, which was signaled by the RG. This may include the IP edge router accessing its own stored plan of mappings in order to make appropriate conversions between IPv6 and IPv4.

At step 230, data packets traverse a given layer-2 device (e.g., an aggregation switch), and traverse a DSLAM. At step 240, native IPv4 packets arrive at a respective RG, which is associated with the original multicast channel request (i.e., a join request) from the host. At step 250, the RG can identify that this is a unique tunnel, which commands different processing. At step 260, the RG can strip the IPv4 header from incoming packets of the multicast channel and, subsequently, pass the IPv6 packets to the host. At step 270, the host receives this multicast channel in IPv6, which matches its expectations.

As a general proposition, from the upstream direction (from the RG to the IP edge router), an effective control plane signaling is being coordinated (e.g., converted between protocols) by communication system 10. In the downstream direction, data plane conversion (e.g., inclusive of encapsulation activities) is being achieved by communication system 10.

Note that in certain example implementations, the multicast delivery functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 2] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, IP edge router 24, RG 36, and/or RG 38 may include software in order to achieve the multicast delivery functions outlined herein. These activities can be facilitated by multicast tunneling modules 56*a-c* and/or mapping tables 54*a-c*. IP edge router 24, RG 36, and/or RG 38 can include memory elements for storing information to be used in achieving the intelligent multicast delivery activities, as discussed herein. Additionally, IP edge router 24, RG 36, and/or RG 38 may include a processor that can execute software or an algorithm to perform the multicast delivery operations, as disclosed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, mapping tables 54*a-c*, cache, etc.) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the preceding flow diagrams illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols (e.g., IGMP), communication system 10 may be applicable to other protocols and arrangements. Moreover, the present disclosure is equally applicable to various technologies, aside from residential or DSL architectures, as these have only been offered for purposes of discussion. Additionally, although communication system 10 has been illustrated with reference to particular elements and operations that facilitate the communication process, these elements and operations may be replaced by any suitable architecture or process that achieves the intended functionality of communication system 10.

What is claimed is:

1. A method, comprising:
  receiving, at a first hop 6rd border router, multicast signaling data associated with a request for a multicast channel, wherein the request includes an Internet protocol version 6 (IPv6) source and an IPv6 group address, wherein the 6rd border router is provisioned between an IPv6 enabled site and an IPv4 enabled service provider;
  identifying an Internet protocol version 4 (IPv4) equivalent multicast source and group address to be mapped to the IPv6 source and the IPv6 group address, wherein an IPv6 packet from the IPv6 source follows an IPv4 routing topology within an IPv4 network;
  converting the multicast signaling data from a first protocol to a second protocol at a residential gateway, wherein the first protocol is a multicast listener discovery (MLD) protocol and the second protocol is an Internet Management Group Protocol (IGMP), and wherein the residential gateway is in communication with more than one IPv6 multicast receiver, wherein converting the multicast signaling data from the first protocol to the second protocol includes converting an MLD request to an IGMP request, wherein the MLD request includes an IPv6 group address and an IPv6 source address and the conversion includes translating the MLD request to an IGMP request by mapping the IPv6 group address to an IPv4 group address and the IPv6 source address to an IPv4 source address; and communicating the converted multicast signaling data to a digital subscriber line access multiplexer (DSLAM) for communication to the 6rd border router, wherein the 6rd border router is configured for IPv6 multicasting within a 6rd domain.

2. The method of claim 1, wherein an addressing plan is configured for a network in which the 6rd border router resides, the addressing plan including IPv4 and IPv6 object mappings.

3. The method of claim 1, further comprising:
receiving IPv4 packets that include IPv4 headers that are part of encapsulated IPv6 packets;
removing the IPv4 headers from the IPv4 packets; and
communicating the IPv6 packets to a host associated with the request for the multicast channel.

4. The method of claim 1, further comprising:
accessing a mapping table that includes mappings between the IPv6 source and the IPv6 group address, and the IPv4 multicast source and group address.

5. The method of claim 1, wherein the 6rd border router is configured to join the multicast channel and stream data in response to receiving the converted signaling data.

6. The method of claim 5, wherein the 6rd border router is configured to perform an encapsulation operation to transport IPv6 multicast packets within an IPv4 multicast channel.

7. A method, comprising:
receiving multicast signaling data associated with a request;
joining a multicast channel, wherein the multicast signaling data has been converted from a first protocol to a second protocol at a residential gateway, wherein the first protocol is a multicast listener discovery (MLD) protocol and the second protocol is an Internet Management Group Protocol (IGMP), wherein converting the multicast signaling data from the first protocol to the second protocol includes converting an MLD request to an IGMP request, wherein the MLD request includes an IPv6 group address and an IPv6 source address and the conversion includes translating the MLD request to an IGMP request by mapping the IPv6 group address to an IPv4 group address and the IPv6 source address to an IPv4 source address, and wherein the residential gateway is in communication with more than one IPv6 multicast receiver;
encapsulating Internet version 6 (IPv6) packets that include an Internet protocol version 6 (IPv6) multicast source and group address to be transported over an Internet protocol version 4 (IPv4) multicast channel by identifying an Internet protocol version 4 (IPv4) equivalent multicast source and group address, wherein an IPv6 packet from a IPv6 source follows an IPv4 routing topology within an IPv4 network; and
communicating the packets to a digital subscriber line access multiplexer (DSLAM) for communication to a first hop 6rd border router, wherein the 6rd border router is configured for IPv6 multicasting within a 6rd domain, wherein the 6rd border router is provisioned between an IPv6 enabled site and an IPv4enabled service provider.

8. The method of claim 7, wherein an addressing plan is configured for a network in which the multicast signaling data propagates, the addressing plan including IPv4 and IPv6 object mappings.

9. The method of claim 7, further comprising:
evaluating the request in order to identify the IPv4 multicast channel.

10. The method of claim 7, further comprising:
accessing a mapping table that includes mappings between IPv6 objects and IPv4 objects.

11. An apparatus, comprising:
a memory element configured to store data,
a processor operable to execute instructions associated with the data, and
a multicast tunneling module, the apparatus being configured to cause the processor to:
receive multicast signaling data associated with a request for a multicast channel, wherein the request includes an Internet protocol version 6 (IPv6) IPv6 source and an IPv6 group address;
identify an Internet protocol version 4 (IPv4) equivalent multicast source and group address to be mapped to the IPv6 source and the IPv6 group address, wherein an IPv6 packet from the IPv6 source follows an IPv4 routing topology within an IPv4 network;
convert the multicast signaling data from a first protocol to a second protocol at a residential gateway, wherein the first protocol is a multicast listener discovery (MLD) protocol and the second protocol is an Internet Management Group Protocol (IGMP), wherein converting the multicast signaling data from the first protocol to the second protocol includes converting an MLD request to an IGMP request, wherein the MLD request includes the IPv6 group and the IPv6 source address and the conversion includes translating the MLD request to an IGMP request by mapping the IPv6 group address to an IPv4 group address and the IPv6 source address to an IPv4 source address, and wherein the residential gateway is in communication with more than one IPv6 multicast receiver; and
communicate the converted multicast signaling data to a digital subscriber line access multiplexer (DSLAM) for communication to a 6rd border router, wherein the 6rd border router is configured for IPv6 multicasting within a 6rd domain, wherein the 6rd border router is provisioned between an IPv6 enabled site and an IPv4 enabled service provider.

12. The apparatus of claim 11, further comprising:
an addressing plan configured for a network in which the network element resides, the addressing plan including IPv4 and IPv6 object mappings.

13. The apparatus of claim 11, further comprising:
a mapping table that includes mappings between the IPv6 source and the IPv6 group address, and the IPv4 multicast source and group address, wherein the mapping table is accessed by the multicast tunneling module.

14. The apparatus of claim 11, wherein the multicast tunneling module is further configured to:
receive IPv4 packets that include IPv4 headers that are part of encapsulated IPv6 packets;
remove the IPv4 headers from the IPv4 packets; and
communicate the IPv6 packets to a host associated with the request for the multicast channel.

15. The apparatus of claim 11, wherein the 6rd border router is configured to join the multicast channel and stream data in response to receiving the converted signaling data.

16. The apparatus of claim 15, wherein the 6rd border router is configured to perform an encapsulation operation to transport IPv6 multicast packets within an IPv4 multicast channel.

17. An apparatus, comprising:
a memory element configured to store data,
a processor operable to execute instructions associated with the data, and
a multicast tunneling module, the apparatus being configured to cause the processor to:
receive multicast signaling data associated with a request;
join a multicast channel, wherein the multicast signaling data has been converted from a first protocol to a second protocol at a residential gateway, wherein the first protocol is a multicast listener discovery (MLD) protocol and the second protocol is an Internet Management Group Protocol (IGMP), and wherein the residential gateway is in communication with more than one IPv6 multicast receiver, wherein converting the multicast signaling data from a first protocol to a second protocol includes converting an MLD request to an IGMP request, wherein the MLD request includes an Internet version 6 (IPv6) group address and an IPv6 source address and the conversion includes translating the MLD request to an IGMP request by mapping the IPv6 group address and the IPv6 source address to an Internet protocol version 4 (IPv4) group address and an IPv4 source address;
encapsulate packets that include an IPv6 multicast source and group address to be transported over an IPv4 multicast channel by identifying an IPv4 equivalent multicast source and group address, wherein an IPv6 packet from the IPv6 source follows an IPv4 routing topology within an IPv4 network; and
communicate the packets to a digital subscriber line access multiplexer (DSLAM) for communication to a 6rd border router, wherein the 6rd border router is configured for IPv6 multicasting within a 6rd domain, wherein the 6rd border router is provisioned between an IPv6 enabled site and an IPv4 enabled service provider.

18. The apparatus of claim 17, further comprising:
an addressing plan configured for a network in which the multicast signaling data propagates, the addressing plan including IPv4 and IPv6 object mappings.

19. The apparatus of claim 17, further comprising:
a mapping table that includes mappings between IPv6 objects and IPv4 objects, wherein the mapping table is accessed by the multicast tunneling module.

20. The method of claim 1, wherein the IPv4 group address is a source specific multicast group address.

21. The method of claim 1, wherein the converted multicast signaling data allows for an IPv6 multicast within a 6rd domain.

22. The method of claim 1, wherein the operational domain of the 6rd border router is limited to a service provider's network.

23. The method of claim 1, wherein the multicast signaling data utilizes an IPv4 multicast infrastructure in a service provider network.

24. The method of claim 1, wherein the 6rd router is a border router and represents a first hop IP router.

* * * * *